United States Patent
Kruse

(10) Patent No.: US 10,550,896 B2
(45) Date of Patent: Feb. 4, 2020

(54) PISTON ASSEMBLY

(71) Applicant: Schaeffler Technologies AG & Co. KG, Herzogenaurach (DE)

(72) Inventor: Matthias Kruse, Sasbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 350 days.

(21) Appl. No.: 15/486,651

(22) Filed: Apr. 13, 2017

(65) Prior Publication Data

US 2018/0298958 A1   Oct. 18, 2018

(51) Int. Cl.
*F16D 25/0638* (2006.01)
*F15B 15/12* (2006.01)
*F16D 25/12* (2006.01)
*F16D 25/04* (2006.01)

(52) U.S. Cl.
CPC .......... *F16D 25/0638* (2013.01); *F15B 15/12* (2013.01); *F16D 25/042* (2013.01); *F16D 25/12* (2013.01)

(58) Field of Classification Search
CPC ........ F15B 15/10; F15B 15/12; F15B 15/125; F16D 25/04; F16D 25/042; F16D 25/044; F16D 25/0638; F16D 25/12
See application file for complete search history.

(56) References Cited

U.S. PATENT DOCUMENTS

| 3,463,284 A * | 8/1969 | Kampert | F16D 25/044 192/48.611 |
| 5,439,083 A * | 8/1995 | Brock | F16D 25/044 192/70.2 |
| 6,971,494 B2 * | 12/2005 | Puiu | F16D 43/216 180/249 |
| 2012/0234646 A1 | 9/2012 | Hemphill | |

FOREIGN PATENT DOCUMENTS

WO   WO-2015148973 A1 * 10/2015 ......... F16D 25/0638

* cited by examiner

Primary Examiner — Richard M Lorence
(74) Attorney, Agent, or Firm — Lekeisha M. Suggs

(57) ABSTRACT

A piston assembly for a clutch pack including a piston in form of a ring-shaped plate, a stator connected to the piston, the stator having a circular stator main part and at least one radial protrusion extending radially outwardly from the circular stator main part, each of the at least one radial protrusion of the stator having a first side and a second side, and including a rotor that is connected to the stator, the rotor having a circular rotor main part and at least one radial protrusion extending radially inwardly from the circular rotor main part, each of the at least one radial protrusion of the rotor having a first side and a second side. A pressure chamber is formed between the second side of the at least one radial protrusion of the stator and the first side of an adjacent one of the at least one radial protrusion of the rotor, and an expandable vessel being provided in the pressure chamber between the radial protrusions of the stator and the rotor with the expandable vessel having an expandable volume.

17 Claims, 4 Drawing Sheets

PISTON ASSEMBLY

FIELD OF INVENTION

The present invention relates to a travel compensating piston assembly for a clutch pack, comprising a piston in the form of a ring-shaped plate, a stator connected to the piston, the stator having a circular stator main part and at least one radial protrusion extending radially outwardly from the circular stator main part, each said at least one radial protrusion of the stator having a first side and a second side, further comprising a rotor that is connected to the stator, the rotor having a circular rotor main part and at least one radial protrusion extending radially inwardly from the circular rotor main part, each said at least one radial protrusion of the rotor having a first side and a second side, and comprising a pressure chamber formed between the second side of the at least one radial protrusion of the stator and the first side of an adjacent one of the at least one radial protrusion of the rotor.

BACKGROUND

Similar piston assemblies are known in the state of the art. Published patent application WO 2015/148973 which is incorporated herein by reference as if fully set forth discloses an expandable piston assembly for a clutch pack including an apply piston, a stator, a rotor and at least one side cover fixed to the stator. The stator is fixed to the apply piston and includes a first arcuate segment and a first radial protrusion extending from the first arcuate segment and including a distal end, with the rotor being axially aligned with and rotatable relative to the stator and including a second arcuate segment extending proximate the first radial protrusion distal end and a second radial protrusion extending from the second arcuate segment and including a distal end proximate the first arcuate segment. This arrangement uses radially extending protrusions from the stator and rotor to form a pressure chamber that can be expanded via pressurized hydraulic fluid to rotate the rotor relative to the stator to expand the piston assembly. However, the known arrangements introduce fluid leakage to the clutch which reduces the efficiency of the transmission.

SUMMARY

One exemplary embodiment improves the known arrangement and reduces leakage from a piston assembly for a clutch pack by providing an arrangement comprising a piston in form of a ring-shaped plate, a stator connected to the piston. The stator has a circular stator main part and at least one radial protrusion extending radially outwardly from the circular stator main part, each of the said at least one radial protrusion of the stator having a first side and a second side. A rotor is provided that is connected to the stator, the rotor has a circular rotor main part and at least one radial protrusion extending radially inwardly from the circular rotor main part, each said at least one radial protrusion of the rotor having a first side and a second side. A pressure chamber is formed between the second side of the at least one radial protrusion of the stator and the first side of an adjacent one of the at least one radial protrusion of the rotor. An expendable vessel is provided in the pressure chamber between the radial protrusions of the stator and the rotor with the expandable vessel having an expandable volume. This way the efficiency of the transmission can be optimized as leakages of the pressure chamber of the piston can be prevented.

In an embodiment, a spring for preloading the rotor is provided, the spring is preloading the rotor such that the first side of the adjacent one of the at least one radial protrusion of the rotor is biased toward the second side of the at least one radial protrusion of the stator. The spring is provided between the first side of the at least one radial protrusion of the stator and the second side of an adjacent one of the radial protrusion of the rotor for preloading the rotor against the stator.

In another embodiment, the expandable vessel can be made of rubber or another suitable material to either stretch or expand the pressure chamber.

In another embodiment the stator is provided radially inwards of the rotor.

In another embodiment an outer face of the at least one radial protrusion of the stator lies in contact with an inner surface of the circular rotor main part.

In another embodiment, the stator has holes for the connection with the piston.

The stator can be connected to the piston by rivets.

In another embodiment, the expandable vessel has an opening that extends at least partly through the piston.

In another embodiment, the opening of the expandable vessel is connected to the piston by a form fit.

As an alternative, the opening of the expandable vessel can be connected to the piston by a bonded connection. One bonded connection between the opening of the expandable vessel and the piston could be molding to form a molded connection.

In one embodiment, the connection between the opening of the expandable vessel and the piston is located on the outer orifice of the piston in order to prevent leakages.

In another embodiment, the expandable vessel is made of an elastic material.

In another arrangement, the expandable vessel includes a bellows shaped sidewall.

In another embodiment of the invention, at least one second pressure chamber is provided circumferentially spaced-apart between the stator and the rotor.

In another embodiment, the spring is provided in the second pressure chamber.

Additionally, one further objective that is achieved is a method for actuating a piston assembly for a clutch pack as described above, wherein a hydraulic pressure is applied to the expandable vessel in the pressure chamber, the expandable vessel extending its volume so that it loads a force to the first side of the rotor, the rotor is moving in a circumferential direction as soon as the pressure in the pressure chamber is higher than a force of the spring.

In addition, the rotor is moved back in the circumferential direction by the force of the spring as soon as the pressure in the pressure chamber is lower than the force of the spring.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
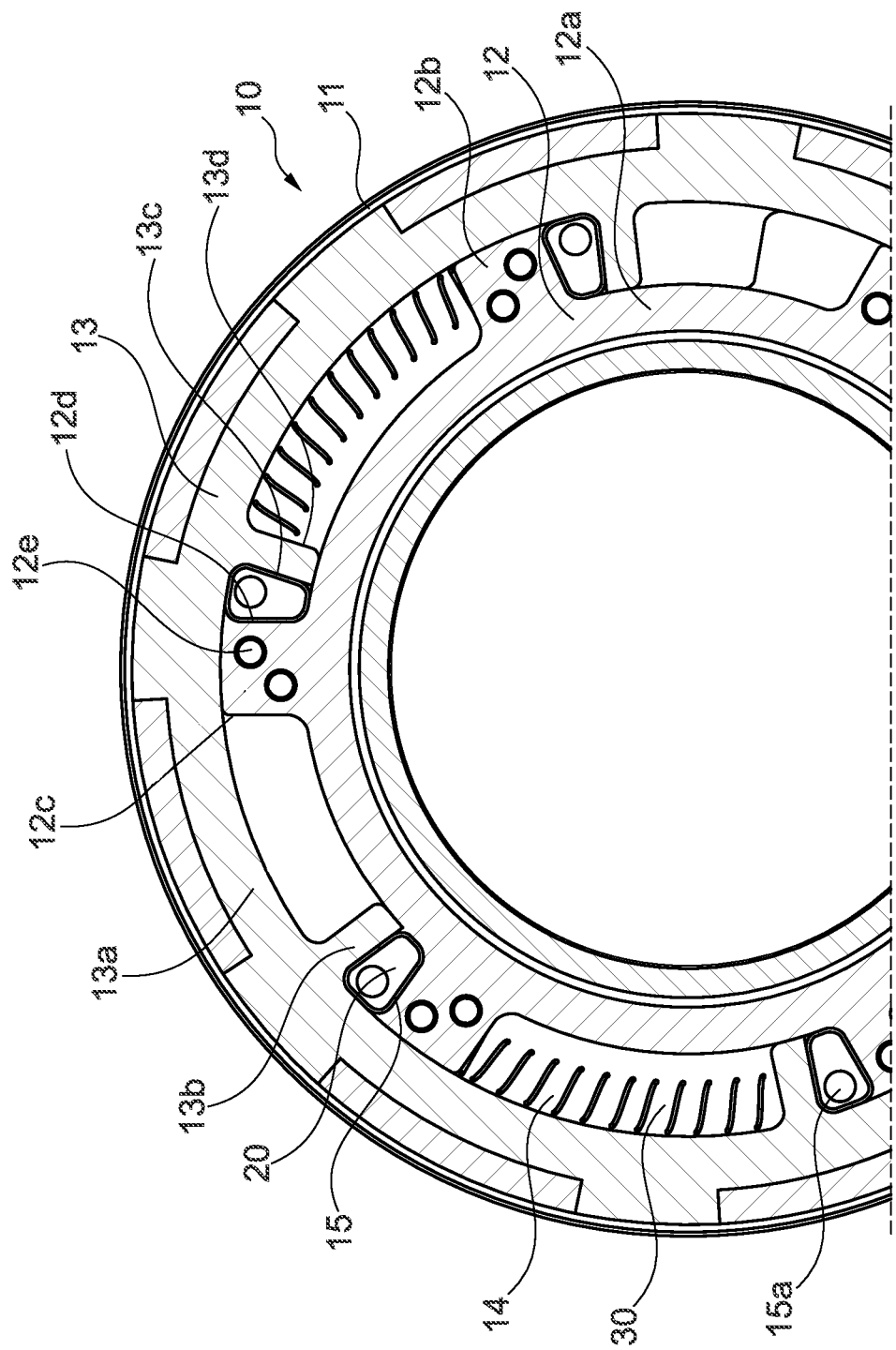
FIG. 1 is a cross-sectional view through a piston assembly with an expandable vessel shown between a rotor and a stator, with the rotor in its initial position.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 shows a cross-sectional view through a piston assembly 10 in a first embodiment. The piston assembly 10 for a clutch pack comprises a ring-shaped piston 11 with an opening in its middle and a stator 12. The stator 12 has a circular stator main part 12a with radial protrusions 12b. In an exemplary embodiment, the stator 12 has six radial protrusions 12b that are distributed around the circumference of the circular stator main part 12a. The radial protrusions 12b can be distributed evenly around the circumference of the circular stator main part 12a. Those protrusions 12b extend radially outwardly from the circular stator main part 12a. The stator 12 is provided radially inside the piston 11. The radial protrusions 12b of the stator 12 have holes 12e for the connection with the piston 11. The connection between the piston and the stator 12 can be made by rivets that are assembled into the holes 12e of the stator 12.

Each radial protrusion 12b of the stator 12 further has a first side 12c and a second side 12d. A rotor 13 is provided radially outside of the stator 12. The rotor 13 has a circular rotor main part 13a with a diameter smaller than the diameter of the piston 11 and bigger than the diameter of the circular stator main part 12a. The rotor 13 has radial protrusions 13b that extend radially inwardly from the circular rotor main part 13a. The rotor 13 can have six radial protrusions 13b that are distributed around the circumference of the circular rotor main part 13a. The radial protrusions 13b of the rotor 13 are distributed evenly around the circumference of the circular rotor main part 13a. The radial protrusions 13b of the rotor 13 have a first side 13c and a second side 13d.

The radial protrusions 12b, 13b of the stator 12 and the rotor 13 overlap in a radial direction so that the outer face of the radial protrusion(s) 12b of the stator is (are) in contact with the inner circumference of the circular rotor main part 13a and the inner face of the radial protrusion(s) 13b of the rotor 13 is (are) in contact with the outer circumference of the circular stator main part 12a.

A pressure chamber 20 is provided in a circumferential direction between the second side 12d of the radial protrusion 12b of the stator and the first side 13c of the radial protrusion 13b of the rotor. In the preferred embodiment where the stator 12 and the rotor 13 each have six radial protrusions 12b, 13a, there are six of the pressure chambers 20. However, those skilled in the art will recognize that this number can be varied. Within each pressure chamber 20 there is provided an expandable vessel 15 that can be filled with hydraulic medium. The expandable vessel 15 is made of an elastic material so that it expands as soon as the hydraulic pressure in the vessel 15 rises. The expandable vessel 15 has an opening 15a for the fluid connection to the piston-side 11. That opening 15a is connected to the orifice of the piston 11 by a form-fit and/or a bonding connection, such as molding, so that any leakage between the expandable vessel 15 and the piston 11 is sealed off.

A spring 14 is provided that biases the rotor 13 relative to the stator 12 such that the first side 13c of the adjacent one of the at least one radial protrusion 13b of the rotor is biased toward the second side 12d of the at least one radial protrusion 12b of the stator 12. In one embodiment, each spring 14 is located between the second side 13d of the radial protrusion 13b of the rotor 13 and the first side 12c of the radial protrusion of the stator 12. The ends of the spring 14 are supported by and in contact with the radial protrusions 12b, 13b of the rotor 13 and the stator 12. The spring 14 can be provided in a second pressure chamber 30 with a pressure that is lower than the pressure in the pressure chamber 20. As shown in FIG. 1, a plurality of springs 14 are provided.

Figure 2:
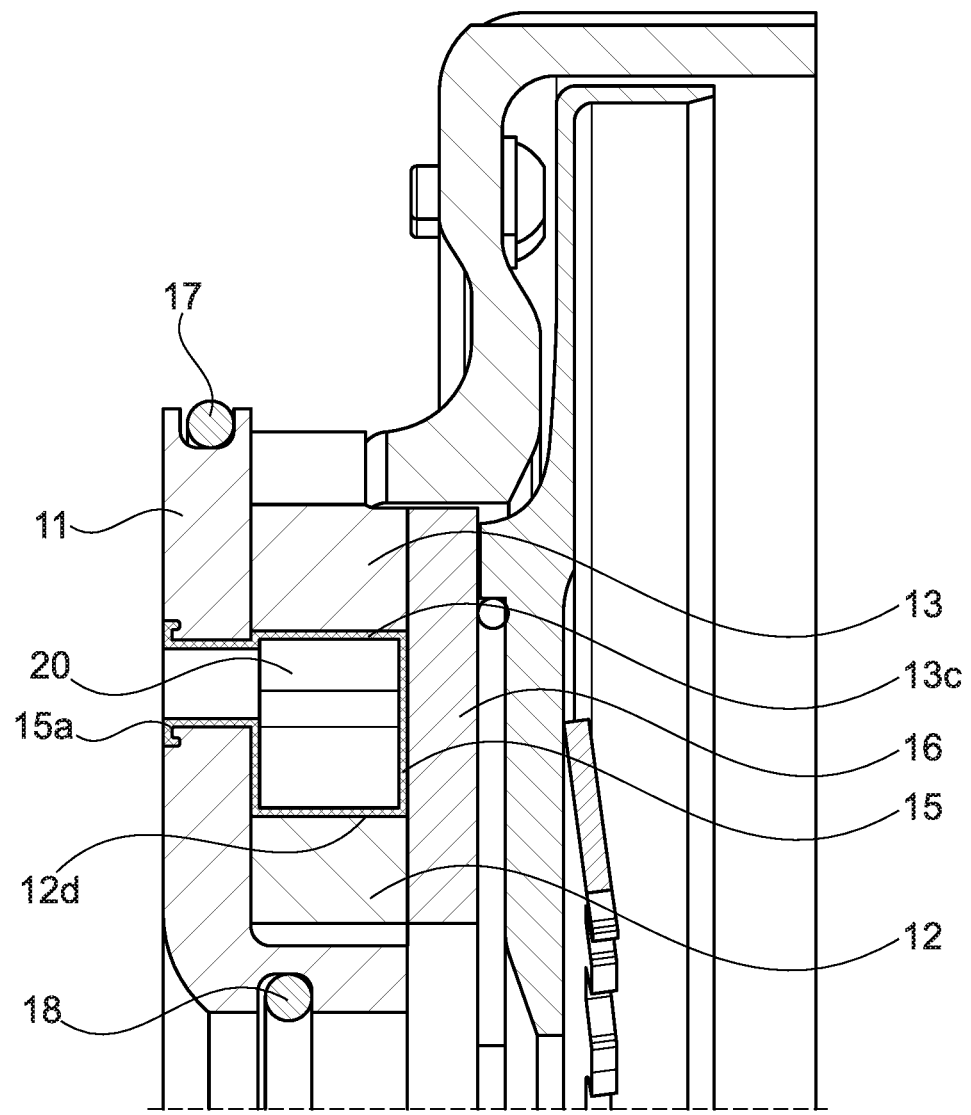
FIG. 2 is detailed profile view of the piston assembly according to FIG. 1.

FIG. 2 shows a detailed profile view of the piston assembly according to FIG. 1. The piston 11 has an L-shaped part and has grooves for seals 17, 18 that seal off the piston 11 to the connecting parts. Adjacent to the piston 11 there are provided the stator 12 and the rotor 13. In between the stator 12 and the rotor 13 there is provided the expandable vessel 15 in the pressure chamber 20, or in the exemplary embodiment shown, multiple expandable vessels 15 are provided, with one being located in each of the pressure chambers 20. The opening 15a of the expandable vessel 15 extends through the piston 11 and is connected to the piston on its orifice by a form-fit or a bonded connection such as by molding to form a molded connection. The connection seals off any leakage between the expandable vessel 15 and the piston 11 to ensure that there is no hydraulic medium flow from the pressure chamber 20 to the second pressure chamber 30. Furthermore, the sealed connection between the opening 15a and the piston 11 ensures that the expandable vessel 15 does not collapse under the fluid pressure on the high pressure side of the pressure chamber 20. The rotor 13 and the stator 12 are in contact with the piston 11 on the radially outer side and with a side plate 16 on the radially inner side. In one embodiment, the expandable vessel 15 fills out the whole pressure chamber 20.

Figure 3:
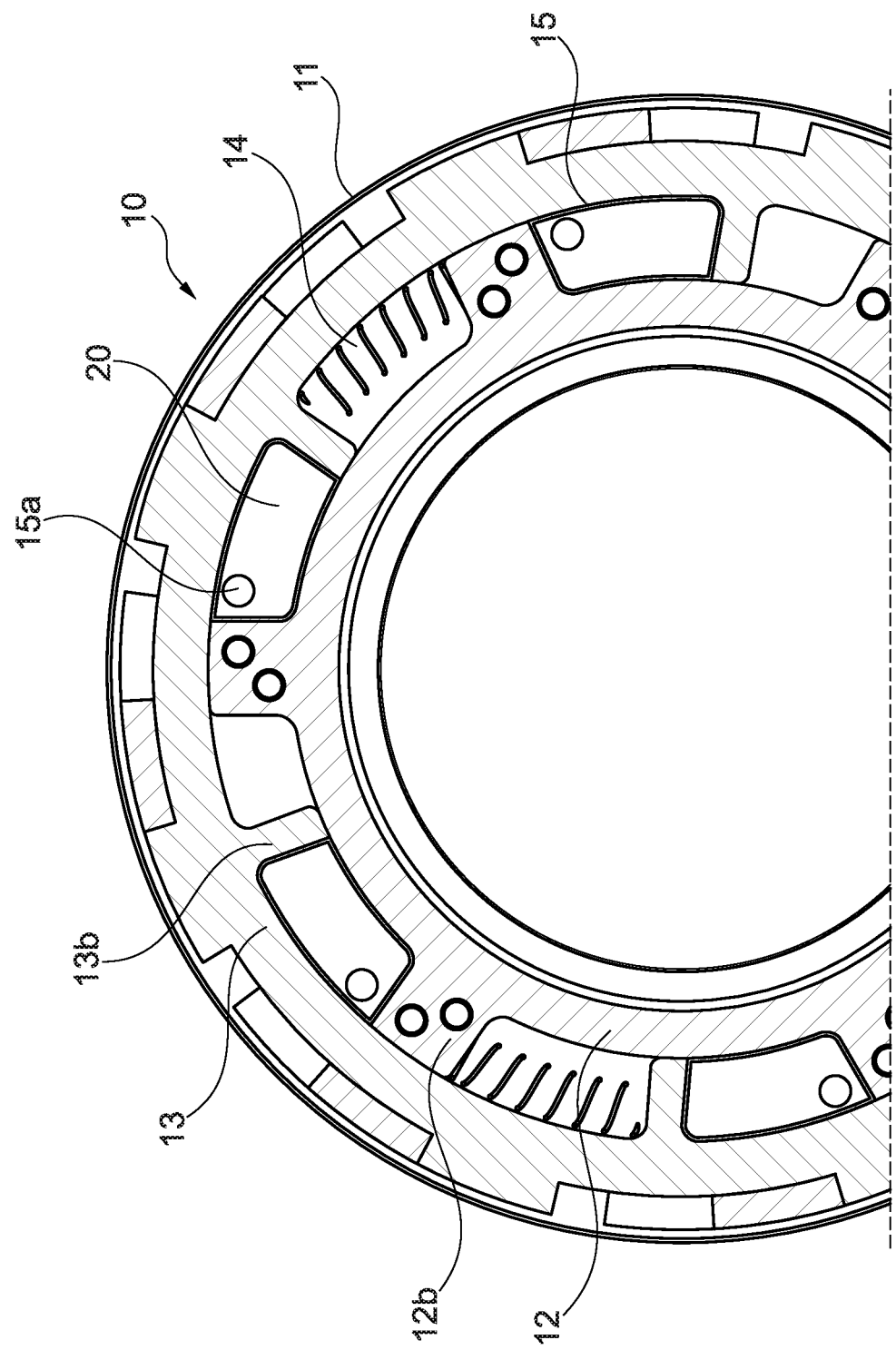
FIG. 3 shows a cross-sectional view through the piston assembly with the expendable vessel, the expendable vessel having an at least partially expanded volume.

FIG. 3 shows a cross-sectional view through the piston assembly with the expendable vessel 15, the expendable vessel 15 having an at least partially expanded volume. When applying hydraulic medium, especially oil, to the back side of the piston 11, the hydraulic medium will flow through the opening 15a of the expandable vessel 15 in the pressure chamber 20. Since the expandable vessel 15 in the pressure chamber 20 contacts the rotor 13 and the stator 12, especially their radial protrusions 12b, 13b, the hydraulic medium creates a load on the radial protrusion 13b of the rotor and the radial protrusion 12b of the stator. Once the hydraulic medium pressure in the expandable vessel 15 overcomes the preload of the spring 14, that is provided in the second pressure chamber 30, the rotor 13 starts to move in a circumferential direction. The volume of the pressure chamber 20 increases due to the rotation of the rotor 13. Therefore, the vessel 15 is expandable to fill this increasing volume. In one embodiment, the material of the expandable vessel 15 is an elastic material that is stretchable, such as a synthetic rubber, such as neoprene. In another embodiment, the expandable vessel 15 has a bellow-shaped sidewall.

For the disengagement of the clutch pack, a valve (not shown) is opened so that the fluid pressure in the expandable vessel 15 drops. As soon as the fluid pressure in the expandable vessel 15 is less than the force of the spring 14, the rotor 13 is moved back into its initial position. While the rotor 13 turns back, the medium/fluid inside the pressure chamber 20 of the expandable vessel 15 get squeezed out through its opening 15a and the pressure chamber 20 returns to its original size and shape.

Figure 4:
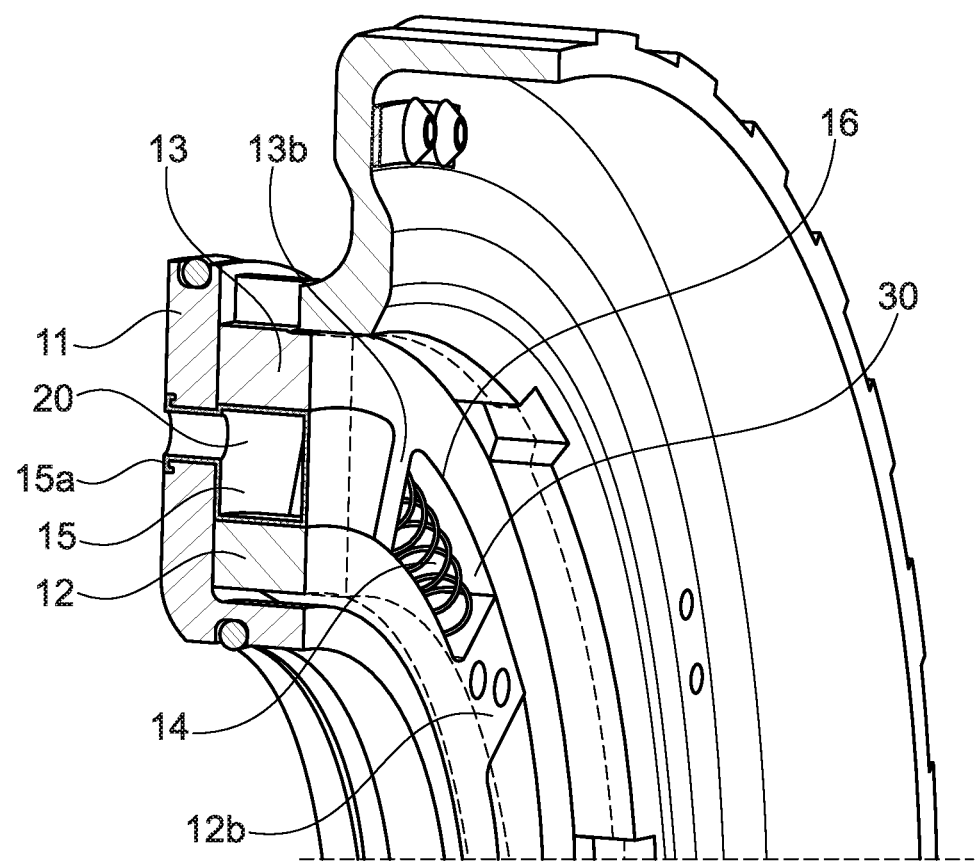
FIG. 4 shows an isometric view of the piston assembly.

FIG. 4 shows an isometric view of the piston assembly. The expandable vessel 15 is integrated into the pressure chamber 20 and surrounded by the rotor 13, the stator 12, the piston 11 and the side plate 16. The opening 15a of the expandable vessel reaches through the whole width of the piston 11. In the second pressure chamber 30 there is provided the spring 14, with its ends being in contact with and having a preload on the radial protrusions 12b, 13b of the rotor 13 and the stator 12. When pressure/medium is applied from the piston-side 11 towards the pressure chamber 20 and the expandable vessel 15, the vessel 15 expands its volume. As the vessel 15 is in direct contact with the radial protrusions 12b, 13b of the stator 12 and the rotor 13, the rotor starts to move in a circumferential direction against the force of the spring 14 in the second pressure chamber 30. When the pressure on the piston side 11 and thus in the expandable vessel 15 drops, the force of the spring 14 pushes the rotor 13 back into its initial position.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS 10 piston assembly
11 piston
12 stator
12a circular stator main part
12b radial protrusion
12c first side
12d second side
12e holes
13 rotor
13a circular rotor main part
13b radial protrusion
13c first side
13d second side
14 spring
15 expandable vessel
15a opening
16 side plate
17, 18 seal
20 pressure chamber
30 second pressure chamber

What is claimed is:

1. A piston assembly for a clutch pack comprising:
a piston in form of a ring-shaped plate;
a stator connected to the piston; the stator having a circular stator main part and at least one radial protrusion extending radially outwardly from the circular stator main part; each said at least one radial protrusion of the stator having a first side and a second side;
a rotor that is connected to the stator, the rotor having a circular rotor main part and at least one radial protrusion extending radially inwardly from the circular rotor main part; each said at least one radial protrusion of the rotor having a first side and a second side;
a pressure chamber formed between the second side of the at least one radial protrusion of the stator and the first side of an adjacent one of the at least one radial protrusion of the rotor;
an expandable vessel being provided in the pressure chamber between the radial protrusions of the stator and the rotor with the expandable vessel having an expandable volume.

2. The piston assembly as recited in claim 1, wherein a spring is provided for preloading the rotor such that the first side of the adjacent one of the at least one radial protrusion of the rotor is biased toward the second side of the at least one radial protrusion of the stator.

3. The piston assembly as recited in claim 2, wherein at least one second pressure chamber is provided circumferentially spaced-apart between the stator and the rotor.

4. The piston assembly as recited in claim 3, wherein the spring is provided in the second pressure chamber.

5. A method for actuating the piston assembly for a clutch pack according to claim 2, comprising: applying a hydraulic pressure to the expandable vessel in the pressure chamber, the expandable vessel extending its volume so that it loads a force to the first side of the rotor, and moving the rotor in a circumferential direction as soon as the pressure in the expandable vessel is higher than a force of the spring.

6. The method for actuating a piston assembly for a clutch pack according to claim 5, further comprising moving the rotor back in the circumferential direction by the force of the spring as soon as the pressure in the expandable vessel is lower than the force of the spring.

7. The piston assembly as recited in claim 2, wherein the expandable vessel includes a bellow shaped sidewall.

8. The piston assembly as recited in claim 1, wherein the stator is provided radially inwards of the rotor.

9. The piston assembly as recited in claim 1, wherein an outer face of the at least one radial protrusion of the stator lies in contact with an inner surface of the circular rotor main part.

10. The piston assembly as recited in claim 1, wherein the stator has holes for the connection with the piston.

11. The piston assembly as recited in claim 1, wherein the stator is connected to the piston by rivets.

12. The piston assembly as recited in claim 1, wherein the expandable vessel has an opening that extends at least partly through the piston.

13. The piston assembly as recited in claim 12, wherein the opening is connected to the piston by a form fit.

14. The piston assembly as recited in claim 12, wherein the opening is connected to the piston by a bonded connection.

15. The piston assembly as recited in claim 14, wherein the opening is connected to the piston by molding.

16. The piston assembly as recited in claim 1, wherein the expandable vessel is made of an elastic material.

17. The piston assembly as recited in claim 1, wherein the expandable vessel includes a bellow shaped sidewall.

\* \* \* \* \*